(12) United States Patent
Ku

(10) Patent No.: US 10,801,875 B2
(45) Date of Patent: Oct. 13, 2020

(54) LIQUID LEVEL DETECTION METHOD AND LIQUID LEVEL SENSOR

(71) Applicant: DONGGUAN ZHENGYANG ELECTRONIC MECHANICAL CO., LTD., Guangdong (CN)

(72) Inventor: Yi-Hsin Ku, Guangdong (CN)

(73) Assignee: DONGGUAN ZHENGYANG ELECTRONIC MECHANICAL CO., LTD., Guangdong (CN)

( * ) Notice: Subject to any disclaimer, the term of this patent is extended or adjusted under 35 U.S.C. 154(b) by 62 days.

(21) Appl. No.: 16/324,378

(22) PCT Filed: Jan. 6, 2017

(86) PCT No.: PCT/CN2017/070497
§ 371 (c)(1),
(2) Date: Feb. 8, 2019

(87) PCT Pub. No.: WO2018/028147
PCT Pub. Date: Feb. 15, 2018

(65) Prior Publication Data
US 2019/0170562 A1 Jun. 6, 2019

(30) Foreign Application Priority Data
Aug. 11, 2016 (CN) .......................... 2016 1 0657209

(51) Int. Cl.
*G01F 23/72* (2006.01)
*G01F 25/00* (2006.01)
*G01F 23/74* (2006.01)

(52) U.S. Cl.
CPC .............. *G01F 23/72* (2013.01); *G01F 23/74* (2013.01); *G01F 25/0061* (2013.01)

(58) Field of Classification Search
CPC ............................ G01F 23/72; G01F 23/0061
See application file for complete search history.

(56) References Cited

U.S. PATENT DOCUMENTS

| 4,589,282 A | 5/1986 | Dumery |
| 2018/0058905 A1* | 3/2018 | Zhang ..................... G01F 23/74 |

FOREIGN PATENT DOCUMENTS

| CN | 2727710 | 9/2005 |
| CN | 201697698 | 1/2011 |

(Continued)

OTHER PUBLICATIONS

International Search Report dated May 23, 2017, cited in PCT/CN2017/070497.

(Continued)

*Primary Examiner* — Paul M. West
(74) *Attorney, Agent, or Firm* — Workman Nydegger

(57) ABSTRACT

Provided is a liquid level detection method and a liquid level sensor, which relate to the field of liquid level measurement technologies. The liquid level detection method includes that a position of a magnetic field formed by two magnets with same poles disposed facing to each other changes accordingly when a position of a float changes; a plurality of magnetoresistive elements for collecting magnetoresistive signals is disposed equidistantly at a movement range of the float; and two adjacent magnetoresistive elements located between the two magnets detect change of magnetic field intensity and output a linear detection result when the float moves, and a liquid level height value is calculated according to the detection result.

6 Claims, 4 Drawing Sheets

(56) References Cited

FOREIGN PATENT DOCUMENTS

| CN | 102121844 | 7/2011 |
| CN | 102353425 | 2/2012 |
| CN | 103791984 | 5/2014 |
| CN | 105486386 | 4/2016 |
| CN | 105675092 | 6/2016 |
| CN | 205940716 | 2/2017 |
| WO | WO 9817974 | 4/1998 |
| WO | WO2015165593 | 5/2015 |

OTHER PUBLICATIONS

European Search Report issued in PCT/CN2017070497 dated Feb. 14, 2020.

* cited by examiner

LIQUID LEVEL DETECTION METHOD AND LIQUID LEVEL SENSOR

CROSS-REFERENCES TO RELATED APPLICATIONS

This application is a national stage application under 35 U.S.C. 371 based on international patent application PCT/CN2017/070497, filed Jan. 6, 2017 which claims priority to Chinese patent application No. 201610657209.4, filed Aug. 11, 2016, the disclosures of which are incorporated herein by reference in their entirety.

TECHNICAL FIELD

The present disclosure relates to the technical field of liquid level measurement, and for example, relates to a liquid level detection method and a liquid level sensor used for implementing the liquid level detection method.

BACKGROUND

To facilitate knowing the height of liquid in a container (such as the liquid level height in a car fuel tank), especially when the container is made of an opaque material, it is necessary to use change of physical parameters (such as capacitance, resistance, inductance, sound speed and light speed) of electrical quantity or non-electrical quantity caused by difference between physical properties of mediums on both sides of the liquid level or change of the liquid level.

A detection method in the existing art is to integrate a magnetoresistive (MR) element switch and a sampling resistor on a printed circuit board (PCB) component of a liquid level sensor. When a magnetic float moves adjacent to the MR element, a magnetic field is generated, and a switch inside the MR element closes when the MR element detects that there is the magnetic field nearby. The closing of MR elements in different positions will cause change of a sampling resistance value, thereby causing change of an output voltage. Thus the height of the liquid level can be detected by detecting the change of the output voltage. The defect of this method is poor precision. To improve the detection precision, it is necessary to increase the number of MR elements and reduce the distance between the MR elements, which in turn leads to high output cost and great processing difficulty.

Another detection method in the existing art is to detect and obtain a magnetic declination of a magnetic nearby by an angle measurement element, and to obtain the height of the liquid level where the magnet is located according to the magnetic declination and a preset vertical distance eventually. The defect of this method is that the magnetic float should move in a fixed direction. However, a guide rail-recess structure that implements the magnetic float moving in the fixed direction may easily cause the magnetic float to be stuck in a specific position of an electronic tube and not to continue to move.

SUMMARY

The present disclosure provides a liquid level detection method with a high precision.

The present disclosure further provides a liquid level sensor with a high measurement precision which solves the problem of a float getting stuck.

On the one hand, the present disclosure adopts the solutions described below.

A liquid level detection method includes:

forming a magnetic field by two magnets with same poles disposed facing to each other; where a position of the magnetic field changes accordingly when a position of a float changes;

disposing a plurality of magnetoresistive elements equidistantly for collecting magnetoresistive signals at a movement range of the float; and detecting, by two adjacent magnetoresistive elements located between the two magnets, change of a magnetic field intensity and outputting a linear detection result, when the float moves, and calculating, according to the detection result, a liquid level height value.

Optionally, the step of detecting, by the two adjacent magnetoresistive elements located between the two magnets, change of the magnetic field intensity and outputting the linear detection result, when the float moves, and calculating, according to the detection result, the liquid level height value, includes:

denoting an output voltage value of a first magnetoresistive element as $V_{1Initial}$ when the output voltage value is not affected by the magnetic field;

denoting a position where the first magnetoresistive element is located between the two magnets during the magnet moves along with the float as a current position, and denoting the output voltage value of the first magnetoresistive element at the time when the first magnetoresistive element is located between the two magnets as $V_{1Current}$; and calculating a distance H between the first magnetoresistive element and a plane where a designated position on the magnet is located along a movement direction of the float by using a difference between output voltage values $V_{1Current}$ and $V_{1Initial}$; and obtaining, by adding or subtracting the distance H according to a position of the first magnetoresistive element on an electronic tube, the liquid level height value.

Optionally, the step of detecting, by the two adjacent magnetoresistive elements located between the two magnets, change of the magnetic field intensity and outputting the linear detection result when the float moves, and calculating, according to the detection result, the liquid level height value includes:

denoting an output voltage value of a first magnetoresistive element which is not affected by the magnetic field as $V_{1Initial}$ and an output voltage value of a second magnetoresistive element which is not affected by the magnetic field as $V_{2Initial}$;

denoting a position where the first magnetoresistive element and the second magnetoresistive element are located between the two magnets during the magnet moves along with the float as a current position, and denoting the output voltage value of the first magnetoresistive element at the time when the first magnetoresistive element and the second magnetoresistive element are located between the two magnets as $V_{1Current}$ and the output voltage value of the second magnetoresistive element at the time when the first magnetoresistive element and the second magnetoresistive element are located between the two magnets as $V_{2Current}$;

calculating a distance H between the first magnetoresistive element and a plane where a designated position on the magnet is located along a movement direction of the float by using a ratio of a difference between the output voltage values $V_{1Current}$ and $V_{1Initial}$ of the first magnetoresistive element and the difference between the output voltage values $V_{2Current}$ and V2Initial of the second magnetoresistive element; and obtaining, by adding or subtracting the distance H according to a position of the first magnetoresistive element on an electronic tube, the liquid level height value.

Optionally, when a distance between the two adjacent magnetoresistive elements is L, a length of the magnet is 2L and a distance between the two magnets is 2L, an output of the change of the magnetic field intensity detected by the first magnetoresistive element is in a shape of cosine curve and the output of the change of the magnetic field intensity detected by the second magnetoresistive element is in a shape of sine curve, and the phase difference between the output of the first magnetoresistive element and the output of the second magnetoresistive element is 90°; the distance H is calculated according to a formula below:

$$H = \arctan\left(\frac{V_{2Current} - V_{2Initial}}{V_{1Current} - V_{1Initial}}\right) \times \frac{180°}{\pi} \times \frac{L}{90°}$$

where $V_{2Current}$ is a current output voltage value of the second magnetoresistive element, V2Initial is an initial output voltage value of the second magnetoresistive element, $V_{1Current}$ is the current output voltage value of the first magnetoresistive element and $V_{1Initial}$ is the initial output voltage value of the first magnetoresistive element; and the first magnetoresistive element and the second magnetoresistive element are the two adjacent magnetoresistive elements within the magnetic field, and the first magnetoresistive element is located above the second magnetoresistive element.

On the other hand, the present disclosure adopts the solutions described below.

A liquid level sensor for implementing the above liquid level detection method, includes an electronic tube, the plurality of magnetoresistive elements, the float and the two magnets;

where the plurality of magnetoresistive elements are longitudinally and sequentially disposed in the electronic tube;

the float rotatably sleeves on the electronic tube;

the two magnets are disposed on the float, and same poles of the two magnets are disposed facing to the plurality of magnetoresistive elements; and the plurality of magnetoresistive elements are equidistantly distributed, a distance between two adjacent magnetoresistive elements is L, and a length of each of the magnets is 2L.

Optionally, a distance between the two magnets is 2L.

Optionally, a plurality of adjacent magnetoresistive elements are connected to a differential multiplexer switch;

a plurality of differential multiplexer switches are connected to a serial-to-parallel switch, the serial-to-parallel switch is connected to an impedance transformation circuit and a differential amplifier circuit, the differential amplifier circuit is connected to a single-chip microcomputer processing system; and the single-chip microcomputer processing system is connected to the serial-to-parallel switch and an output terminal respectively to implement data collection, data processing and calculation result output.

Optionally, the liquid level sensor further includes a calibration device, which is configured to be connected to the single-chip microcomputer processing system by a digital interface, and record an initial output voltage value of the magnetoresistive element and/or an assembling error value of the liquid level sensor.

The liquid level detection method provided by the present disclosure uses the two adjacent magnetoresistive elements to detect the change of the magnetic resistance and output the linear detection result, and calculate the liquid level height value according to the detection result. Through this method, the measurement precision is high, measurement method is simple, output value is easy to read and measurement process is continuous.

In the liquid level sensor provided by the present disclosure, the distance between the two adjacent magnetoresistive elements is L, the length of the magnet is 2L, there are two magnetoresistive elements are located in the magnetic field formed by the magnets at the same time, implementing the above liquid level detection method with a high measurement precision and solving the problem of a float getting stuck.

1, electronic tube; 2, magnetoresistive element; 3, float; 4, magnet

DETAILED DESCRIPTION

The solutions of the present disclosure are described hereinafter through specific embodiments in conjunction with the accompanying drawings.

First Embodiment

Figure 1:
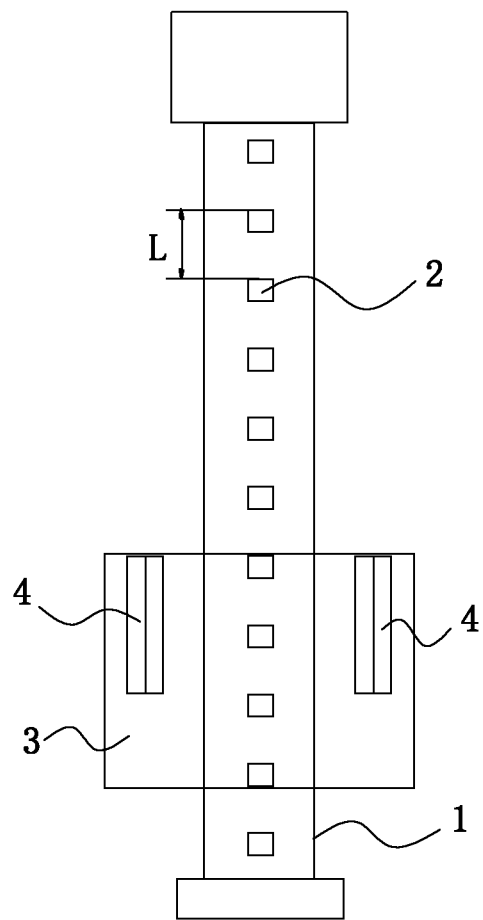
FIG. 1 is a structural diagram of a liquid level sensor according to an embodiment.

This embodiment discloses a liquid level detection method and a liquid level sensor used for implementing the liquid level detection method. As shown in FIG. 1, the liquid level sensor includes an electronic tube 1, multiple magnetoresistive elements 2, a float 3 and two magnets 4.

The multiple magnetoresistive elements 2 are longitudinally and sequentially disposed in the electronic tube 1. The float 3 rotatably sleeves on the electronic tube 1. The two magnets 4 are disposed on the float 3. N poles of the two magnets 4 both face to the multiple magnetoresistive elements 2 or S poles of the two magnets 4 both face to the multiple magnetoresistive elements 2. A distance between two adjacent magnetoresistive elements 2 is L and a length of the magnet 4 is 2L. The multiple magnetoresistive elements 2 are disposed with equidistant spacing to reduce the difficulty of measurement and calculation.

The liquid level detection method may include that: same poles of the two magnets 4 are disposed facing to each other to form a magnetic field; a position of the magnetic field changes accordingly when the position of the float 3 changes; the multiple magnetoresistive elements 2 for collecting magnetoresistive signals is disposed equidistantly at a movement range of the float 3; and two adjacent magnetoresistive elements 2 located between the two magnets 4 detect a magnetic field intensity and output a linear detection result when the float 3 moves, and calculate, according to the detection result, a liquid level height value.

The detection value of the liquid level sensor is output linearly, thus the liquid level detection method based on the liquid level sensor has a high precision, and there is no need to excessively and intensively dispose the magnetoresistive elements 2 in order to improve the measurement precision. The liquid level sensor has a low manufacturing cost, low failure rate, wide application range and is easy to use. The float does not need to move along a fixed direction, that is, the float 3 can rotate. So there is no need to provide a guide rail and a recess on the electronic tube 1 and the float 3, and there will not be a phenomenon of a float being stuck.

Figure 2:
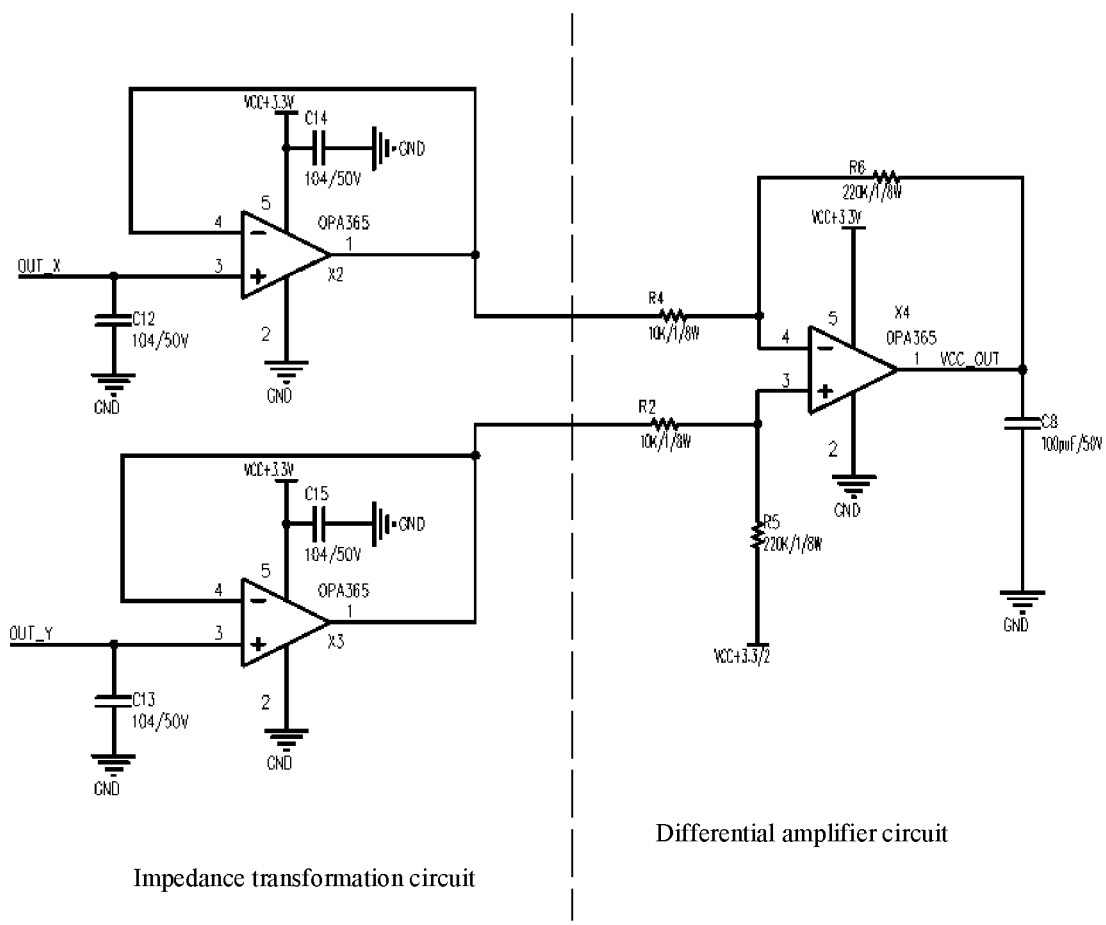
FIG. 2 is a connection diagram of an impedance transformation circuit and a differential amplifier circuit according to an embodiment.

Multiple adjacent magnetoresistive elements 2 are connected to a differential multiplexer switch. Multiple differential multiplexer switches are connected to a serial-to-parallel switch. The serial-to-parallel switch is connected to an impedance transformation circuit and a differential amplifier circuit (as shown in FIG. 2). The differential amplifier circuit is connected to a single-chip microcomputer processing system. The single-chip microcomputer processing system is connected to the serial-to-parallel switch and an output terminal respectively to implement a data collection, data processing and calculation result output.

The magnetoresistive elements 2 connected to the same differential multiplexer switch may be four, eight or another number. The number may be determined according to the number of bits of the differential multiplexer switch. A component of the impedance transformation circuit is optional as long as it can solve the problem of signal collection precision caused by different internal resistance of an analog switch. The impedance transformation circuit may be a voltage follower. The output terminal includes at least one of a voltage terminal, a RS485 interface and a CAN bus. The structure or the device of the differential multiplexer switch and the differential amplifier circuit is optional as long as it can implement the corresponding function.

On the basis of the above structure, the liquid level sensor may also include a calibration device, which is configured to be connected to the single-chip microcomputer processing system by a digital interface, record an initial output voltage value of the magnetoresistive element 2 and/or an assembling error value of the liquid level sensor.

Optionally, steps of the liquid level detection method are described below.

In step S1, when not affected by the magnetic field, an output voltage value of a first magnetoresistive element 21 is denoted as $V_{1Initial}$ and the output voltage value of a second magnetoresistive element 22 is denoted as $V_{2Initial}$. Generally speaking, an initial value $V_{Initial}$ of each magnetoresistive element 2 is determined and recorded after the assembly of the liquid level sensor is completed.

In step S2, a position where the first magnetoresistive element 21 and the second magnetoresistive element 22 are both located between the two magnets 4 during the magnets 4 move upwards or downwards along with the float 3 is denoted as a current position. The output voltage value of the first magnetoresistive element 21 at the time when the first magnetoresistive element 21 and the second magnetoresistive element 22 are both located between the two magnets 4 is denoted as $V_{1Current}$; and the output voltage value of the second magnetoresistive element 22 at the time when the first magnetoresistive element 21 and the second magnetoresistive element 22 are both located between the two magnets 4 is denoted as $V_{2Current}$.

Figure 3:
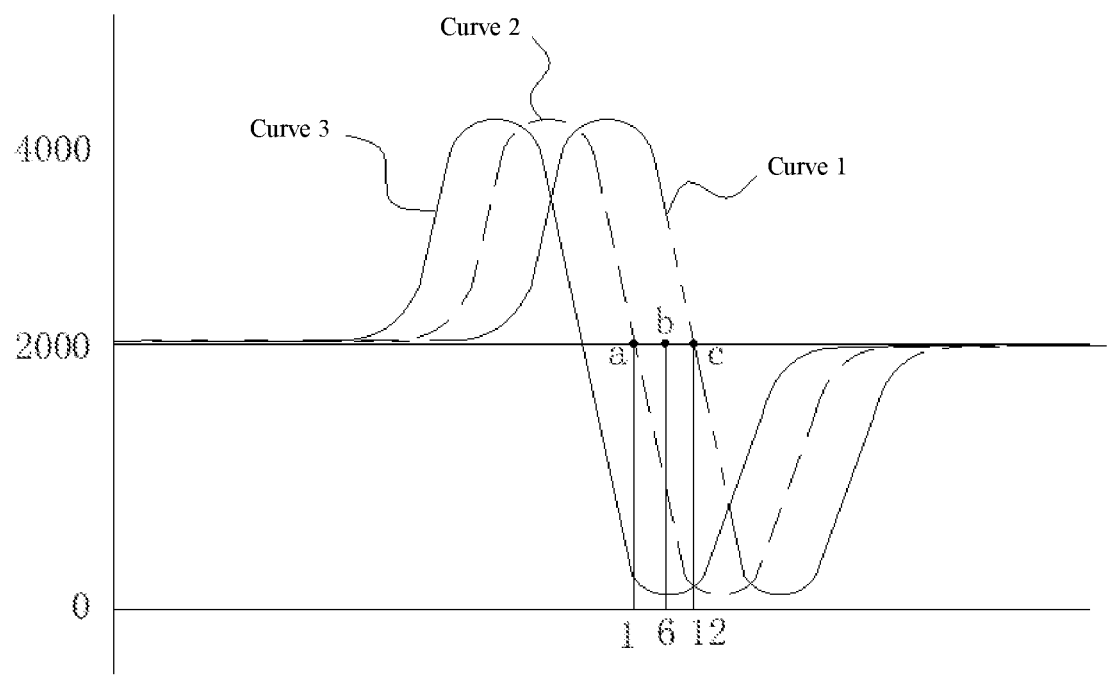
FIG. 3 is output curves of magnetoresistive elements according to an embodiment.

In step S3, when a distance between the two adjacent magnetoresistive elements 2 is L, a length of the magnet 4 is 2L and a distance between the two magnets 4 is 2L, in a process that the magnetoresistive elements 2 moves between the two magnets 4, an output of the curve 1 in FIG. 3 is or approximately is OUT1=cos θ, the output of the curve 2 is or approximately is OUT2=sin θ (that is, an output of the magnetic field intensity detected by the first magnetoresistive element 21 is in a shape of cosine curve, and an output of the magnetic field intensity detected by the second magnetoresistive element 22 is in a shape of sine curve, and the phase difference between the outputs of the first magnetoresistive element 21 and the second magnetoresistive element 22 is 90°). A distance H between the first magnetoresistive element 21 and a plane where a designated position on the magnet 4 is located along a movement direction of the float 3 is calculated according to a formula below.

$$H = 2L \times \frac{\theta}{180°} \quad \text{Formula 2}$$

To reduce the influence of temperature and shaking on the measurement and calculation result, calculation is performed using a ratio of two group of output results.

$$\frac{OUT2}{OUT1} = \tan\theta \quad \text{Formula 3}$$

Formula 4 is obtained according to formula 3.

$$\theta = \arctan\frac{OUT2}{OUT1} = \arctan\left(\frac{V_{2Current} - V_{2Initial}}{V_{1Current} - V_{1Initial}}\right) \quad \text{Formula 4}$$

A radian value is converted to an angle value, formula 5:

$$\theta = \arctan\left(\frac{V_{2Current} - V_{2Initial}}{V_{1Current} - V_{1Initial}}\right) \times \frac{180°}{\pi}$$

Formula 1 is obtained according to formula 2 and formula 5.

$$H = \arctan\left(\frac{V_{2Current} - V_{2Initial}}{V_{1Current} - V_{1Initial}}\right) \times \frac{180°}{\pi} \times \frac{L}{90°} \quad \text{Formula 1}$$

$V_{2Current}$ is a current output voltage value of the second magnetoresistive element 22, $V_{2Initial}$ is an initial output voltage value of the second magnetoresistive element 22, $V_{1Current}$ is the current output voltage value of the first magnetoresistive element 21 and $V_{1Initial}$ is the initial output voltage value of the first magnetoresistive element 21. And the first magnetoresistive element 21 and the second magnetoresistive element 22 are the two adjacent magnetoresistive elements 2 within the magnetic field, and the first magnetoresistive element 21 is located above the second magnetoresistive element 22.

In step S4, the position and height of the first magnetoresistive element 21 on the electronic tube 1 are known. The liquid level height value is obtained by adding or subtracting the distance H according to the position of the first magnetoresistive element 21 on the electronic tube 1. The distance H is the distance between the first magnetoresistive element 21 and the plane where the designated position on the two magnets 4 is located along the movement direction of the float 3. The designated position may be an upper end, a lower end, a middle point of the magnets 4 or any point on the magnets 4. The user may determine the designated position according to usage requirements as long as the designated position facilitates detection and calculation. Since individual difference of the magnetoresistive elements 2 affects the output precision of the liquid level sensor, the initial value, maximum value and minimum value of each chip (magnetoresistive induction chip) need to be verified by a verification instruction after the assembly of the liquid level sensor is completed, and the verification result (usually the initial value) is stored in a single-chip microcomputer, thereby reducing the influence of different values of the magnetoresistive elements 2 on the output precision of the liquid level sensor.

The liquid level detection method is described according to measurement data shown in FIG. 3. In FIG. 3, an ordinate denotes the data obtained by processing the output voltage value of the magnetoresistive elements 2 (this value may be understood as an approximate value of the output value of the magnetoresistive element 2), an abscissa denotes a movement distance of the magnet 4. Optionally, in FIG. 3, the ordinate represents voltage in units of millivolt and the abscissa represents distance in units of millimeter. The three curves in the figure respectively correspond to the three magnetoresistive elements 2 in FIGS. 4 to 6 (curve 1 represents an output curve of the first magnetoresistive element 21, curve 2 represents the output curve of the second magnetoresistive element 22 and curve 3 represents the output curve of the third magnetoresistive element 23). Point a is an initial position (corresponding to FIG. 4), point b is a middle position (corresponding to FIG. 5) and point c is a terminal position (corresponding to FIG. 6). To facilitate understanding and simplify calculation, the magnetoresistive element 2 is theoreticalized into a point in FIGS. 4 to 6.

Figure 4:
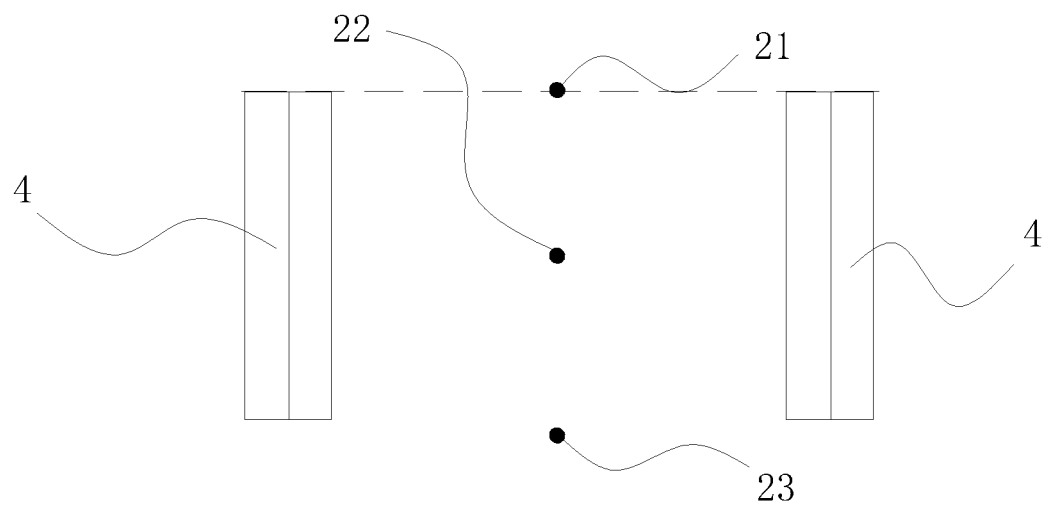
FIG. 4 is a schematic diagram illustrating that magnets are located at an initial position according to an embodiment.

As shown in FIG. 4, the upper end of the magnets 4 which move upwards along with the float 3 arrives a position aligning the first magnetoresistive element 21, in this case, the second magnetoresistive element 22 is located at a middle position of the magnets 4, and a third magnetoresistive element 23 just leaves the lower end position of the magnets 4, that is, point a in FIG. 3. $V_{1Initial}$ of the first magnetoresistive element 21 is about 2000 and $V_{2Initial}$ of the second magnetoresistive element 22 is about 2000. At point a, $V_{1Current}$ of the first magnetoresistive element 21 is about 4000, and $V_{2Current}$ of the second magnetoresistive element 22 is about 2000. The following is obtained by substituting values into the formula 5:

$$\theta = \arctan\left(\frac{V_{2Current} - V_{2Initial}}{V_{1Current} - V_{1Initial}}\right) \times \frac{180°}{\pi} = \arctan\left(\frac{2000 - 2000}{4000 - 2000}\right) \times \frac{180°}{\pi} = 0$$

The following is obtained by substituting θ=0 into the formula 1 or 2:

$$H = 2L \times \frac{\theta}{180°} = 2L \times \frac{0}{180°} = 0$$

That is, point a can be seen as an initial position.

Figure 5:
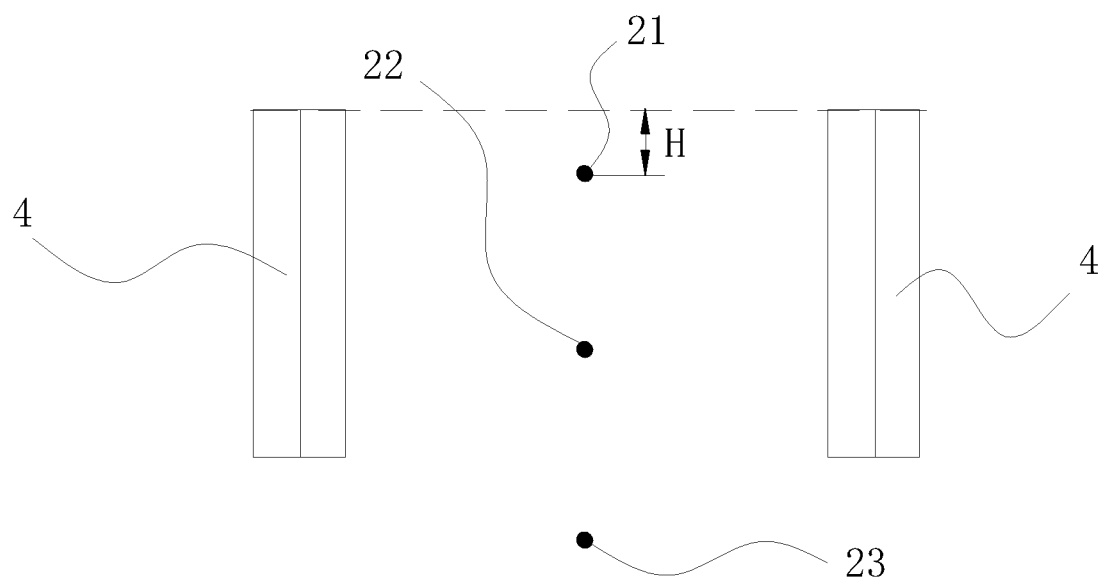
FIG. 5 is a schematic diagram illustrating that magnets are located at a middle position according to an embodiment.

As shown in FIG. 5, the magnets 4 continue to move upwards along with the float 3, the first magnetoresistive element 21 and the second magnetoresistive element 22 are both located between the upper end and the lower end of the magnets 4. And the middle point of the first magnetoresistive element 21 and the second magnetoresistive element 22, and the middle point of the magnets 4 are basically located at the same horizontal line, i.e., point b in FIG. 3. In this case, $V_{1Current}$ of the first magnetoresistive element 21 is about 3500 and $V_{2Current}$ of the second magnetoresistive element 22 is about 500. The following is obtained by substituting these values into the formula 5:

$$\theta = \arctan\left(\frac{V_{2Current} - V_{2Initial}}{V_{1Current} - V_{1Initial}}\right) \times \frac{180°}{\pi} = \arctan\left(\frac{500 - 2000}{3500 - 2000}\right) \times \frac{180°}{\pi} = -45°$$

The following is obtained by substituting θ=−45° into the formula 1 or 2:

$$H = 2L \times \frac{\theta}{180°} = 2L \times \frac{-45°}{180°} = -0.5L$$

That is, point b can be seen as the middle position.

Figure 6:
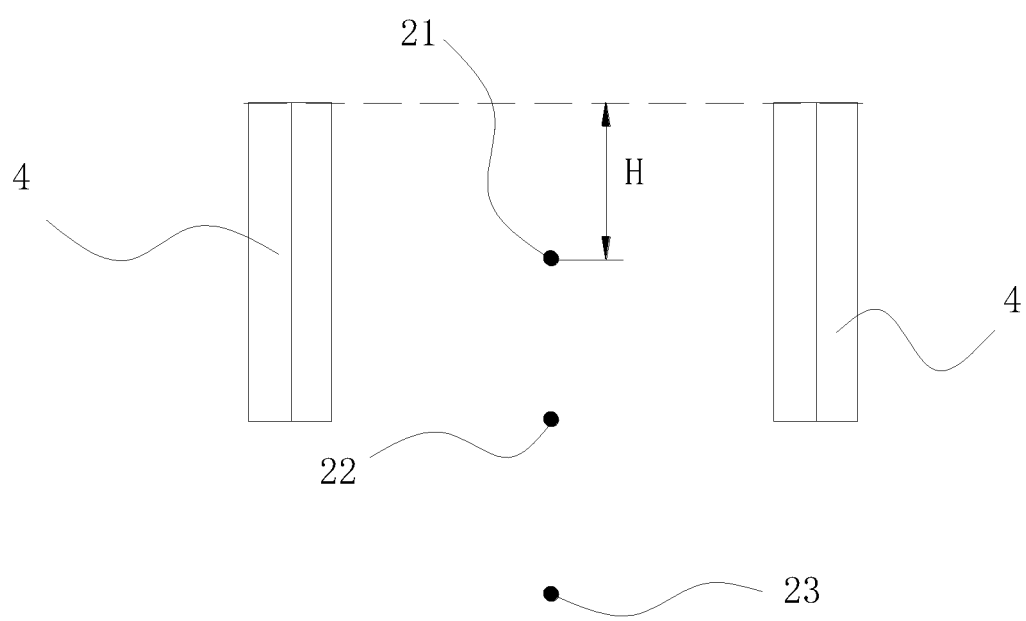
FIG. 6 is a schematic diagram illustrating that magnets are located at a termination position according to an embodiment.

As shown in FIG. 6, the magnets 4 continue to move upwards along with the float 3, the second magnetoresistive element 22 is located at the lower end of the magnets 4, the first magnetoresistive element 21 is located at the middle of the magnets 4, that is, point c in the FIG. 3. In this case, $V_{1Current}$ of the first magnetoresistive element 21 is about 2001 and $V_{2Current}$ of the second magnetoresistive element 22 is about 100. The following is obtained by substituting these values into the formula 5:

$$\theta = \arctan\left(\frac{V_{2Current} - V_{2Initial}}{V_{1Current} - V_{1Initial}}\right) \times \frac{180°}{\pi} = \arctan\left(\frac{100 - 2000}{2001 - 2000}\right) \times \frac{180°}{\pi} = -90°$$

The following is obtained by substituting θ=−90° into the formula 1 or 2:

$$H = 2L \times \frac{\theta}{180°} = 2L \times \frac{-90°}{180°} = -L$$

That is, point c can be seen as the terminal position, the distance between point c and point a is the distance L between the two adjacent magnetoresistive elements 2.

Second Embodiment

This embodiment discloses a liquid level detection method. The principle is basically the same as that of embodiment one. The difference is only one magnetoresistive element is used for detecting in this embodiment. The liquid level detection method includes the following steps.

In step T1, when not affected by the magnetic field, an output voltage value of a first magnetoresistive element 21 is denoted as $V_{1Initial}$.

In step T2, a position where the first magnetoresistive element 21 is located between the two magnets 4 during the magnets 4 move along with the float 3 is denoted as a current position. The output voltage value of the first magnetoresistive element at the time when the first magnetoresistive element 21 is located between the two magnets 4 is denoted as $V_{1Current}$.

In step T3, a distance H between the first magnetoresistive element 21 and a plane where a designated position on the magnet 4 is located along a movement direction of the float 3 is calculated by using a difference between output voltage values $V_{1Current}$ and $V_{1Initial}$; The designated position may be an upper end, a lower end, a middle point of the magnets 4 or any point on the magnets 4. The user may determine according to usage requirements as long as the designated position facilitates detection and calculation.

In step T4, the liquid level height value is obtained by adding or subtracting the distance H according to the position of the first magnetoresistive element 21 on the electronic tube 1. Optionally, when the upper end of the magnets 4 is higher than the position of the first magnetoresistive element 21 on the electronic tube 1 by the distance H, the distance H is added. When the upper end of the magnets 4 is lower than the position of the first magnetoresistive element 21 on the electronic tube 1 by the distance H, the distance H is subtracted.

Third Embodiment

The present disclosure provides a liquid level sensor. The difference between the structure of this liquid level sensor and the liquid level sensor in the first embodiment is that: a distance between two adjacent magnetoresistive elements is L and a length of the magnet 4 is 2L, but a distance between the two magnets 4 is not 2L. A liquid level detection method corresponding to the liquid level sensor of this structure is also that two magnets 4 with same poles disposed facing to each other, a position of the magnetic field changes accordingly when the position of a float 3 changes; magnetoresistive elements 2 in different positions detect the change of the magnetic field intensity and output a linear detection result, and a liquid level height value is calculated according to the detection result, but the formulas used in the detection method needs to be modified and varied based on formulas 1 to 5.

It is to be noted that the above are only optional embodiments of the present application and the technical principles used therein. It will be understood by those skilled in the art that the present disclosure is not limited to the specific embodiments described herein. Those skilled in the art can make various apparent modifications, adaptations and substitutions. Therefore, while the present disclosure has been described in detail via the above-mentioned embodiments, the present disclosure may include more other equivalent embodiments.

What is claimed is:

1. A liquid level sensor for implementing a liquid level detection method, comprising an electronic tube, a plurality of magnetoresistive elements, a float and two magnets;
    wherein the plurality of magnetoresistive elements is longitudinally and sequentially disposed in the electronic tube;
    the float rotatably sleeves on the electronic tube;
    the two magnets are disposed on the float, and same poles of the two magnets are disposed facing to the plurality of magnetoresistive elements; and
    the plurality of magnetoresistive elements is equidistantly distributed, a distance between two adjacent magnetoresistive elements is L, and a length of each of the magnets is 2L;
    wherein the liquid level detection method comprises forming a magnetic field by the two magnets with same poles disposed facing to each other; wherein a position of the magnetic field changes accordingly when a position of the float changes;
    disposing the plurality of magnetoresistive elements equidistantly for collecting magnetoresistive signals at a movement range of the float; and
    detecting, by two adjacent magnetoresistive elements located between the two magnets, change of a magnetic field intensity and outputting a linear detection result, when the float moves, and calculating, according to the detection result, a liquid level height value; and
    wherein:
    a plurality of adjacent magnetoresistive elements is connected to a differential multiplexer switch;
    a plurality of differential multiplexer switches is connected to a serial-to-parallel switch, the serial-to-parallel switch is connected to an impedance transformation circuit and a differential amplifier circuit, the differential amplifier circuit is connected to a single-chip microcomputer processing system; and
    the single-chip microcomputer processing system is connected to the serial-to-parallel switch and an output terminal respectively to implement data collection, data processing and calculation result output.

2. The liquid level sensor according to claim 1, wherein a distance between the two magnets is 2L.

3. The liquid level sensor according to claim 1, further comprising a calibration device, which is configured to be connected to the single-chip microcomputer processing system by a digital interface, and record at least one of an initial output voltage value of the magnetoresistive element and an assembling error value of the liquid level sensor.

4. The liquid level sensor according to claim 1, wherein the step of detecting, by the two adjacent magnetoresistive elements located between the two magnets, change of the magnetic field intensity and outputting the linear detection result, when the float moves, and calculating, according to the detection result, the liquid level height value, comprises:
    denoting an output voltage value of a first magnetoresistive element as $V_{1Initial}$ when the output voltage value is not affected by the magnetic field;
    denoting a position where the first magnetoresistive element is located between the two magnets during the magnet moves along with the float as a current position, and denoting the output voltage value of the first magnetoresistive element at the time when the first magnetoresistive element is located between the two magnets as $V_{1Current}$;
    calculating a distance H between the first magnetoresistive element and a plane where a designated position on the magnet is located along a movement direction of the float by using a difference between output voltage values V1Current and V1 Initial; and
    obtaining, by adding or subtracting the distance H according to a position of the first magnetoresistive element on an electronic tube, the liquid level height value.

5. The liquid level sensor according to claim 1, wherein the step of detecting, by the two adjacent magnetoresistive elements located between the two magnets, change of the magnetic field intensity and outputting the linear detection result when the float moves, and calculating, according to the detection result, the liquid level height value comprises:

denoting an output voltage value of a first magnetoresistive element which is not affected by the magnetic field as $V_{1Initial}$ and an output voltage value of a second magnetoresistive element which is not affected by the magnetic field as $V_{2Initial}$;

denoting a position where the first magnetoresistive element and the second magnetoresistive element are located between the two magnets during the magnet moves along with the float as a current position, and denoting the output voltage value of the first magnetoresistive element at the time when the first magnetoresistive element and the second magnetoresistive element are located between the two magnets as $V_{1Current}$ and the output voltage value of the second magnetoresistive element at the time when the first magnetoresistive element and the second magnetoresistive element are located between the two magnets as $V_{2Current}$;

calculating a distance H between the first magnetoresistive element and a plane where a designated position on the magnet is located along a movement direction of the float by using a ratio of a difference between the output voltage values $V_{1Current}$ and $V_{1Initial}$ of the first magnetoresistive element and the difference between the output voltage values $V_{2Current}$ and $V_{2Initial}$ of the second magnetoresistive element; and obtaining, by adding or subtracting the distance H according to a position of the first magnetoresistive element on an electronic tube, the liquid level height value.

6. The liquid level sensor according to claim 5, wherein a distance between the two magnets is 2L, an output of the magnetic field intensity detected by the first magnetoresistive element is in a shape of cosine curve and an output of the magnetic field intensity detected by the second magnetoresistive element is in a shape of sine curve, and the phase difference between the output of the first magnetoresistive element and the output of the second magnetoresistive element is 90°; the distance H is calculated according to a formula below:

$$H = \arctan\left(\frac{V_{2Current} - V_{2Initial}}{V_{1Current} - V_{1Initial}}\right) \times \frac{180°}{\pi} \times \frac{L}{90°}$$

wherein $V_{2Current}$ is a current output voltage value of the second magnetoresistive element, $V_{2Initial}$ is an initial output voltage value of the second magnetoresistive element, $V_{1Current}$ is the current output voltage value of the first magnetoresistive element and $V_{1Initial}$ is the initial output voltage value of the first magnetoresistive element; and the first magnetoresistive element and the second magnetoresistive element are the two adjacent magnetoresistive elements within the magnetic field, and the first magnetoresistive element is located above the second magnetoresistive element.

* * * * *